US012108734B2

(12) United States Patent
Hoefelmayr (10) Patent No.: US 12,108,734 B2
(45) Date of Patent: Oct. 8, 2024

(54) SAMPLING APPARATUS FOR TAKING REPRESENTATIVE MILK SAMPLE AND METHOD FOR TAKING REPRESENTATIVE MILK SAMPLES

(71) Applicant: LACTOCORDER AG, Niederteufen (CH)

(72) Inventor: Tilman Hoefelmayr, Niederteufen (CH)

(73) Assignee: LACTOCORDER AG, Niederteufen (CH)

( * ) Notice: Subject to any disclaimer, the term of this patent is extended or adjusted under 35 U.S.C. 154(b) by 1162 days.

(21) Appl. No.: 16/639,547

(22) PCT Filed: Aug. 2, 2018

(86) PCT No.: PCT/EP2018/071007
§ 371 (c)(1),
(2) Date: Feb. 14, 2020

(87) PCT Pub. No.: WO2019/034443
PCT Pub. Date: Feb. 21, 2019

(65) Prior Publication Data
US 2021/0127625 A1 May 6, 2021

(30) Foreign Application Priority Data
Aug. 17, 2017 (DE) ...................... 10 2017 214 337.1

(51) Int. Cl.
*A01J 5/04* (2006.01)
*A01J 5/01* (2006.01)
(Continued)

(52) U.S. Cl.
CPC .................. *A01J 5/045* (2013.01); *A01J 5/01* (2013.01); *A01J 5/0133* (2013.01); *A01J 5/0135* (2013.01);
(Continued)

(58) Field of Classification Search
CPC ......... G01N 1/2035; A01J 5/01; A01J 5/0133; A01J 5/0135; A01J 5/045; A01J 5/007; G01F 1/64; G01F 1/661
See application file for complete search history.

(56) References Cited

U.S. PATENT DOCUMENTS

| 5,245,946 A | 9/1993 | Hoefelmayr et al. |
| 5,303,598 A | 4/1994 | Binder et al. |
| 5,645,012 A | 7/1997 | Hoefelmayr |

FOREIGN PATENT DOCUMENTS

| CN | 102665393 A | 9/2012 |
| CN | 103648268 A | 3/2014 |

(Continued)

OTHER PUBLICATIONS

ISA European Patent Office, International Search Report Issued in Application No. PCT/EP2018/071007, Oct. 16, 2018, WIPO, 4 pages.

(Continued)

*Primary Examiner* — John Fitzgerald
*Assistant Examiner* — Truong D Phan
(74) *Attorney, Agent, or Firm* — McCoy Russell LLP (57) ABSTRACT

In one aspect, the invention provides a sampling apparatus for taking a representative milk sample in a predetermined quantity range from a conveying line in which milk is conveyed at conveying intervals of unknown length. The sampling apparatus comprises a pump, a controller of the pump, and a sample container connecting element connecting member in communication with the pump, wherein the controller is configured based on the predetermined quantity range and a measured quantity indicating a flow rate of milk conveyed in the conveying line and/or a predetermined quantity indicating a total quantity of milk to be conveyed through the conveying line in a conveying interval, to control a pulsed operation of the pump in a conveying (Continued)

interval, wherein the pump conveys a discrete sample subset along a first conveying direction of the pump during the pulsed operation in each sample pulse interval, and wherein the predetermined quantity range is greater than or equal to a total quantity corresponding to a total number of discrete sample subsets in the conveying interval.

19 Claims, 4 Drawing Sheets

(51) Int. Cl.
*A01J 5/013* (2006.01)
*G01F 1/64* (2006.01)
*G01F 1/661* (2022.01)
*G01N 1/20* (2006.01)

(52) U.S. Cl.
CPC ............... *G01F 1/64* (2013.01); *G01F 1/661* (2013.01); *G01N 1/2035* (2013.01)

(56) References Cited

FOREIGN PATENT DOCUMENTS

| | | |
|---|---|---|
| CN | 106455517 A | 2/2017 |
| DE | 4331203 A1 | 3/1995 |
| DE | 9422296 U1 | 11/1999 |
| DE | 102011100924 A1 | 11/2012 |
| EP | 0533020 A1 | 3/1993 |
| EP | 0643292 A2 | 3/1995 |
| JP | H0731313 A | 2/1995 |
| JP | H07167755 A | 7/1995 |
| JP | H09135642 A | 5/1997 |
| JP | 2013102700 A | 5/2013 |
| JP | 2014100069 A | 6/2014 |
| WO | 9312413 A1 | 6/1993 |
| WO | WO-9523959 A1 * | 9/1995 .............. A01J 5/045 |

OTHER PUBLICATIONS

Japan Patent Office, Office Action Issued in Application No. 2020-508431, Apr. 6, 2021, 8 pages. (Submitted with Machine Translation).

State Intellectual Property Office of the People's Republic of China, Office Action and Search Report Issued in Application No. 201880067563.9, Mar. 7, 2022, 11 pages. (Submitted with Partial Translation).

* cited by examiner

SAMPLING APPARATUS FOR TAKING REPRESENTATIVE MILK SAMPLE AND METHOD FOR TAKING REPRESENTATIVE MILK SAMPLES

CROSS-REFERENCE TO RELATED APPLICATIONS

The present application is a U.S. National Phase of International Patent Application Serial No. PCT/EP2018/071007 entitled "SAMPLING APPARATUS FOR TAKING A REPRESENTATIVE MILK SAMPLE AND METHOD FOR TAKING REPRESENTATIVE MILK SAMPLES," filed on Aug. 2, 2018. International Patent Application Serial No. PCT/EP2018/071007 claims priority to German Patent Application No. 10 2017 214 337.1 filed on Aug. 17, 2017. The entire contents of each of the above-referenced applications are hereby incorporated by reference for all purposes.

FIELD OF THE INVENTION

The present invention refers to a sampling apparatus for taking a representative milk sample in a predetermined quantity range from a conveying line in which milk is conveyed, for example at conveying intervals of unknown length, and a method for taking representative milk samples.

BACKGROUND

Although in food production the term "milk" is mainly understood to mean cow's milk, in addition to milk from cows, milk produced by other domesticated and farmed animals, which in addition to cows also includes sheep and goats, is also used by humans as food.

Milk is a natural product and naturally contains germs in its raw and especially untreated form as so-called raw milk. Therefore, in addition to determining the fat content of the raw milk, germ contamination is a characteristic for determining the quality of a milk. In Germany, for example, the classification of milk into commercial classes is governed by the Milk Quality Ordinance, which defines criteria for the classification, such as the total bacteria count, the protein and fat content, the freezing point and the identification of possible inhibitors, such as antibiotics, which impede the further processing of the milk into yoghurt or cheese. For example, the total bacteria count is an indicator for industrial hygiene and animal health. Furthermore, a stretching with water can be detected on the basis of deviations in the freezing point of the milk.

For example, in the interest of animal health, monitoring of raw milk for bacteria that can cause inflammation of the mammary glands in domesticated animals is important, especially for the udder health of dairy cows (and other domesticated animals), in order to exclude possible risks in milk production, such as the loss of an animal due to disease, and a possible risk to human health.

In addition, the collection of milk samples as part of a so-called "pregnancy test" is important to monitor the pregnancy status of lactating animals in milk production.

Although milk sampling is important from various points of view (e.g. determination of milk quality and/or monitoring of udder health and/or monitoring of pregnancy status of an animal), in any case, obtaining representative samples under controlled conditions is important for meaningful test results and also in the interest of the milk producer. For example, a contamination of a sample is usually only apparent when a bacterial culture has been cultivated in a laboratory, although at this point in time examination costs have already been incurred, although no meaningful result can be derived from a contaminated sample. The importance of controlled sampling is also evident from the fact that even the smallest errors in sampling can lead to a possibly massive contamination of samples with environmental germs, since the samples are taken at the milking place and not in a "clinically clean" environment.

For example, when determining milk quality, for which the fat content is important in addition to possible bacterial contamination, the representativeness of a milk sample is important when taking a sample, since the fat content of a milk changes during a milking process. In particular, the fat content of milk during milking typically increases from less than 1% fat at the start of milking to 8% to 10% at the end of milking. If a representative milk sample is to be taken during milking, it is important to "dissolve" or scan the entire milking process from start to finish as well as possible when taking the sample. This ensures that for each individual milking section the corresponding proportions of milk constituents enter the sample.

In this context, the so-called "carry-over effect" must also be taken into account, where milk portions from a last milked animal enter the sample of the next milked animal and consequently contaminate it. In view of modern genetic testing, which can detect the smallest amounts of milk constituents, milk samples contaminated in this way can no longer be used for these sample tests.

Furthermore, the milked milk, especially when it is at the body temperature of the milked animal, tends to segregate within a short time. This segregation process is generally known as creaming and is caused by fat globules in the milk, which have a lower specific weight than the other milk components and rise to the surface of the milk more quickly or more slowly over the course of a few minutes depending on their size. As a result, for this reason alone, the ingredients in the milk are by no means homogeneously distributed.

In the classic case, a representative milk sample is obtained by collecting all the milk in a milking bucket during milking and stirring it intensively immediately after milking or by pouring several times between two milking buckets. Immediately after this mixing process, at least one milk sample is taken from the center of the bucket using a special small ladle and placed in a standardized analysis bottle, whereby a contamination is to be avoided. The standardized analysis bottles have a filling volume of 40 to 50 ml and usually contain a preservative, such as Pronopol, in tablet form. By marking the filled analysis bottle, usually by position number, RFID number or barcode, the milk sample can be assigned to an animal and is analyzed by a laboratory.

Today's most widespread method of milk sampling is carried out with the aid of a fixed or mobile milk meter installed in the milking parlor. With these devices, a defined proportion, usually approx. 1% to 2%, is separated from the milk flowing through continuously or in small portions by means of a calibrated nozzle and is fed into a removable intermediate storage container, which usually has a volume of approx. 400 to 750 ml. At the end of the milking process, the content of this container is mixed very intensively by pouring several times into another cup and immediately afterwards the analysis bottle is filled which usually has a volume of approx. 40 to 50 ml. This cost-intensive sampling method is therefore not only dependent on a precise splitting process but also on accurate and reliable manual work by the sampling person. If this activity, which must be carried out on site and during the milking period, is not carried out with due care, the sample results obtained are useless. The fact that such an error is not visible at first glance is particularly serious.

In another well-known sampling method, a milk sample is automatically and directly filled into an analysis bottle at the end of milking based on an electronic milk meter using the so-called "partial split method". During a milking process, a small percentage of milked milk is continuously separated into a permanently installed sample container. At the end of milking, atmospheric air is blown intermittently into the sample container in order to achieve the necessary mixing of the milk collected in the sample container for a representative sample. Afterwards a part of the mixed milk is directly discharged into an analysis bottle, while the rest is sucked off into a milk line and fed to the further milking. However, the implementation of this well-known sampling method requires that the milk meter at the end of milking is still pressurized with vacuum in order to be able to carry out the mixing process and the residual suction. This is therefore a technical requirement for the milking process that cannot be fulfilled in the majority of milking installations in such a way that the vacuum must be maintained on the milk meter beyond the end of milking. Furthermore, this method requires an additional time of typically 10 to 30 seconds after the end of the milking process to fill a sample quantity into an analysis bottle. This additional time, especially when large herds and rapid animal changes are required, such as in the case of sheep or goats, can significantly extend the total milking time, which is unacceptable for modern farms. Furthermore, this sampling scheme is susceptible to carry-over due to the relatively large internal surface of the device.

The partial split method used in this known sampling method has been used for decades in mobile mechanical milk meters. The milk/air flow coming from the udder is accelerated from below via a long, straight, upwardly tapering and exactly vertically directed inlet pipe against a horizontal baffle plate in the head of the device. A homogeneous 360° "milk screen" is formed by the kinetic energy of the dynamically impinging milk flow. From its periphery, a calibrated nozzle is used to continuously separate typically 1% to 2% of the milk that has been milked and to feed it into a measuring cylinder with a volume of approximately 750 ml, from which the quantity of milk milked can be read directly on a graduated scale.

However, this measuring system has considerable disadvantages in terms of milking technology: The device has a high flow resistance, which causes a significant milk flow dependent drop in the milking vacuum level. The device is also highly sensitive to tilt. As with this measuring principle, the accuracy of the splitting is directly dependent on the uniformity and homogeneity of the milk screen and thus on the level of kinetic energy and the precise alignment of the milk flow impinging on the baffle plate, the disadvantages mentioned are inherent in the principle and cannot be "optimized away".

In two other known sampling schemes (LactoCorder and LactoCorder-S; own products) a representative milk sample is filled directly into a standard analysis bottle (50 ml) during the milking process, i.e. without intermediate sample storage. However, a problem arises here in that a splitting ratio in the order of approx. 1:100 to 1:1000 (e.g. sampling of approx. 50 ml on a total milk quantity of 20 to 50 kg milked) can be reliably achieved. However, such wide splitting ratios can no longer be achieved by further simple reduction of the cross-section of the splitting hole (splitting nozzle). Due to a variety of physical conditions (capillary forces, surface tension, runoff no longer following Torricelli's law, caseation, calcification, etc.), a reduction in the size of boreholes in a milk-conveying system is very quickly limited. In order to achieve such wide splitting ratios as are required for direct filling of an analysis bottle without intermediate storage during milking, the required reduction of the split-off milk quantity can only be achieved by means of timed filling. In order to achieve the required representativeness of the milk sample, the milk flow or a related measured variable during the milking process must be determined as accurately and highly resolved as possible as the basis for such a cycle control. As a further control variable, the targeted sample quantity and a rough estimate of the expected milk quantity (approximately +/−40% deviation from the quantity actually milked) are required in order to comply as well as possible with the quantity of a milk sample to be split off, and in particular not to exceed the quantity predetermined by the analysis bottle. If more than the volume of an analysis bottle is split off, there is a risk that overflowing milk will enter the system and contaminate the milk due to the preservative in the analysis bottle.

The known sampling systems described above are sensitive to fluctuations in the vacuum in a measuring chamber in which the quantity of milk being milked is measured. Furthermore, these sampling systems are sensitive to the smallest leaks in the connection of an analysis bottle, such as small out-of-roundings at the bottle neck of an analysis bottle.

There is also a risk that start-up difficulties of the milk milked in sampling systems in which a milk sample is split off by means of a valve, after the valve has been opened, may falsify the quantity of the split-off individual subsets if the valve is opened very briefly.

Furthermore, in the sampling systems described above, there is a risk of a clogging, caseation or sticking-up of the valve closure body if not cleaned properly.

From the document DE 10 2011 100 924 A1, a device through which milk can flow is known for carrying out at least one measurement and for taking milk samples from a milking machine with a measuring device and a sampling apparatus designed to feed milk to a sample container. A channel open at the top is arranged upstream of the measuring device and is designed to receive at least part of the milk separated from the air mixed with it in an air separation device and to direct it in such a way that it flows at least partially to the sampling apparatus.

DE 94 22 296 U1 shows a milking device for automatic milking of dairy cows, in which teat cups are connected to a collection glass by milk lines. At the bottom of the collecting glass there is a socket to which a line is connected. The line is connected to a liquid pump. In one line section of the pump, lines are connected in which computer-controlled valves are arranged, which open into sample bottles for taking milk samples.

In view of the state of the art described above, one object is to provide a sampling apparatus for taking a representative sample of milk in a predetermined quantity range from a conveying line in which milk is conveyed during a milking process of unknown length, and a method for taking representative milk samples, while avoiding the problems mentioned above.

SUMMARY

In a first aspect, the invention provides a sampling apparatus for taking a representative sample of milk in a given quantity range from a conveying line in which milk is conveyed at conveying intervals of unknown length. According to exemplary embodiments, the sampling apparatus comprises a pump, a controller of the pump and a sample container connection element connected to the pump. The controller is configured to control a pulsed operation of the pump in a conveying interval based on the predetermined quantity range and a measured variable indicative of a flow rate of milk conveyed in the conveying line and/or a measured variable indicative of a flow velocity of milk conveyed in the conveying line and/or a predetermined variable indicative of a total quantity of milk to be conveyed through the conveying line in a conveying interval, in a conveying interval in a first mode of operation. During pulsed operation, the pump conveys a discrete sample subset along a first conveying direction of the pump in a sample pulse interval. Furthermore, the predetermined quantity range is greater than or equal to a total quantity that corresponds to a total number of discrete sample subsets in the conveying interval.

In a second aspect of the present invention, a method is provided for taking representative milk samples in a predetermined quantity range from a conveying line in which milk is conveyed in conveying intervals of unknown length, wherein the predetermined quantity range is greater than or equal to a total quantity corresponding to a total number of discrete sample subsets in the conveying interval. In accordance with illustrative embodiments, the method comprises, in a first mode of operation, determining an operating rate of a pump based on the predetermined quantity range and a predetermined value which estimates a length of a conveying interval and/or estimates a total amount conveyed through the conveying line in the conveying interval and/or estimates a variable which indicates a flow rate or change thereof conveyed in the conveying line in the conveying interval, the operating rate defining a certain number of sample pulse intervals. In each sample pulse interval, the pump conveys a discrete sample subset along a first conveying direction. The method further includes operating the pump based on the determined operating rate in the first conveying direction. In an advantageous configuration of the second aspect, the method may further comprise detecting an actual value indicative of the flow rate in the conveying line and/or an actual value indicative of a flow velocity of the milk conveyed in the conveying line, updating the operating rate based on the detected actual value, and operating the pump based on the updated operating rate in the first conveying direction.

In a preferred embodiment of the second aspect, the method may comprise detecting an actual value indicating the flow rate in the conveying line and/or an actual value indicating a flow velocity of the milk conveyed in the conveying line, updating the operating rate based on the detected actual value, and operating the pump based on the updated operating rate in the first conveying direction.

The first and second aspects of the invention described above enable a representative sampling of milk to be taken in a predetermined quantity range during a milking operation of unknown length. In spite of the unknown length of the milking process, the representativeness of the collected milk sample is not impaired, as the sample is taken by means of a sampling apparatus with pump, pump controller and sample container connection element, whereby sampling at a selectable point in a milking device is still permitted. In particular, contamination caused by exceeding the predetermined quantity range by a representative milk sample collected in the milking process as a whole, e.g. by overflowing of a sample container, shall be avoided.

The first and second aspects of the present invention described above further allow a flexible adaptation of the sampling to a large spread of milk flow rates in conveying lines over conveying intervals of unknown length.

Since the sampling apparatus according to the first aspect is independent of any applied dynamic or hydrostatic pressure in the conveying line, the sampling apparatus can be placed at any point along the conveying line. During a sampling, each sample subset can be directly output into a sample container without pressure. This allows gentle sampling, so that, for example, the sensitive fat globules contained in the split-off milk are not damaged.

In a first embodiment of the first aspect, the control is further configured to control the operation of the pump based on a comparison between an actual quantity corresponding to an actual number of sample subsets conveyed and the predetermined quantity range. Thus, premature reaching of the predetermined quantity range in the conveying interval can be detected and overflowing of a sample container into which the sample subsets are split off can be avoided. The operation of the pump can be controlled based on the detected actual value of the flow rate. For example, the detected actual value can be compared with at least one previous actual value of the flow rate and the control can be designed to control the operation of the pump based on the comparison between the actual value of the flow rate and at least one previous actual value. Thus, despite a conveying interval of unknown length, a resolution of a sampling at any time during the conveying interval can be achieved. For example, sampling during a milking process may be carried out with a relatively fine resolution towards the end of the milking process, especially in the case of low milk flows and high fat content, if the comparison allows the identification of an end of milking. Experience has shown that in cows, a flow rate of 200 g/min can be regarded as a limit between milking and blind milking, i.e. milking without substantial milking. On the basis of the comparison, blind milking, and thus a milking end of a milking process, could be detected by detecting, on the basis of a current comparison and on the basis of previous comparisons, that after a detected tendency of a decreasing flow rate there is no longer a significant change in the flow rate, e.g. a change in the flow rate is less than a certain value, e.g. less than 10% or less than 5% or less than 1%. A relatively fine resolution can then be achieved by increasing the frequency of splitting off a sample subset in a unit time interval, e.g. within one minute.

A control on the basis of a comparison between an actual value of the flow rate and at least one preceding actual value can, for example, be carried out in such a way that a current measured variable representing an actual value of the flow rate is related to at least one preceding measured variable representing a preceding actual value of the flow rate, e.g. a quotient and/or a difference is formed. On the basis of this ratio, a comparison between different flow rates can be made without having to determine absolute values directly. For example, a control of the pump by the controller on the basis of a quotient and/or a difference of actual values can be carried out without great effort with regard to an electronic evaluation in the controller, wherein a memory device, e.g. a DRAM device or an SRAM device or a flash memory device, is provided in the controller which at least temporarily stores the current actual value and at least one preceding actual value.

In a second configuration of the first aspect, the controller is further configured to control the operation of the pump to interrupt the first mode of operation and to convey a subset of the actual quantity of the actual number of sample subsets conveyed at an interruption interval in a second mode of operation in a second conveying direction that is opposite to the first conveying direction. In this way, a conveying of a partial quantity of milk previously milked corresponding to the actual quantity of milk previously conveyed by the pump in the first conveying direction, which is indicated by an actual number of sample subsets, can be achieved during operation of the pump in the second mode of operation in an interruption interval in a second conveying direction. This is particularly advantageous if it is recognized or estimated at a given point in time that an actual quantity conveyed to date is approaching a predetermined quantity range, even though no end to the conveying interval is foreseeable or recognizable. For example, the actual quantity produced to date may deviate from the predetermined quantity range by a predetermined value. For example, the predetermined value may be within a range of about 1% to about 25% of an upper limit of the predetermined quantity range, or it may differ from an upper limit of the predetermined quantity range by a predetermined number of sample subsets, each of which is conveyed in a sample pulse interval during current operation, for example, one sample subset, two sample subsets, three sample subsets, to name a few non-restrictive examples. In order to prevent the danger of a quantity of sample subsets exceeding the predetermined quantity in a sample container, a partial quantity is conveyed along the second conveying direction and thus taken from the quantity of sample subsets accumulated up to that point. This can be done automatically, although an end of a conveying interval is not known and therefore a pre-defined partition of a representative sample with a given quantity into discrete sample subsets cannot be determined exactly, because the total quantity conveyed in the conveying interval is not known before the end of the conveying interval.

In a third configuration of the first aspect, the controller is further configured to control pulsed operation of the pump to update, in the first mode of operation, a number of sample pulse intervals for the remaining duration of the conveying interval and/or a size of the sample pulse intervals after the interruption interval based on a remaining actual quantity. This allows a better estimation to be made after the interruption interval for collecting discrete sample subsets for a remaining subset of the actual quantity after the interruption interval based on current data and the representativeness of the milk sample taken is maintained. For example, an increase in the frequency with which sample subsets are split off, which is equivalent to an increase in the number of sample pulse intervals for the remaining duration of the conveying interval, may be accompanied by a corresponding reduction in the length of sample pulse intervals, so that a relative increase in resolution at sampling is achieved without reducing the representativeness of the milk sample. For example, for a pregnancy test, approximately the first 10% of a milking are decisive, so that a highly resolved and at the same time representative milk sample can be advantageously achieved if the pump is controlled in such a way that samples taken initially provide a high resolution, in particular that an increased number of samples or samples are split off with an increased frequency initially and the resolution is reduced from a certain point in time. In addition or alternatively, at the end of a milking process, a corresponding procedure can be carried out to achieve a high-resolution scan of a milking end.

In a fourth configuration of the first aspect, the sampling apparatus also includes a mixing device which is designed to mix the actual quantity collected in a sample container before the interruption interval. The controller is further configured to activate the mixing device in the second mode of operation before the pump is operated in the interruption interval. In this way, a representativeness of the actual quantity can be ensured according to the conveyed actual number of sample subsets up to the interruption interval.

In a fifth configuration of the first aspect, after at least one sample pulse interval, the controller is configured to update a number of sample pulse intervals based on the measured quantity. This allows an adjustment of the operation of the pump on the basis of the measured quantity without using further data, such as data from a history of past conveying intervals.

In a sixth configuration of the first aspect, the sampling apparatus also includes a pair of ring electrodes designed to detect a conductance value of the milk conveyed in the conveying line. This allows the sampling apparatus to determine a measure of the flow rate of the milk in the conveying line independently of external flow meters and can be operated independently of external databases. By adding a further ring electrode or a further pair of ring electrodes, the flow velocity can also be measured and thus the determination of the flow rate can be further improved. For example, the sampling apparatus may further comprise a further pair of ring electrodes adapted to detect a conductance of milk conveyed in the conveying line, wherein the controller is configured to control operation of the pump based on the flow rate of milk conveyed in the conveying line based on conductances detected by the pair of ring electrodes and the further pair of ring electrodes. A flow velocity can be determined by comparing the conductance values recorded by the two pairs of ring electrodes and one of time values assigned to these conductance values.

In a seventh configuration of the first aspect, the sampling apparatus herein may further comprise a settling chamber and a pair of electrodes arranged in the settling chamber to detect conductivity of milk in the settling chamber. Thus, a contribution of air to the conductance measured by the pair of ring electrodes can be calculated.

In an eighth configuration of the first aspect, the sampling apparatus may further comprise an optical flow sensor having a light source and a light detector connected to the controller, the controller being configured to control the pump based on data output from the optical flow sensor. By means of the optical flow sensor, the flow of milk can easily be quantitatively monitored without the need for mechanical contact between milk and sensor, such as with electrical sensor elements.

In a first configuration of the second aspect, operation of the pump in the first mode of operation is interrupted if an actual quantity of a conveyed actual number of sample subsets approaches the predetermined quantity range up to a predetermined distance and it is determined on the basis of the recorded actual value that a current conveying interval has not yet ended. This avoids that a quantity of sample subsets, which corresponds to the quantity of milk split off up to that point, which has been conveyed along the first conveying direction, exceeds the predetermined quantity.

In a second configuration of the second aspect, the method further comprises operating the pump in a second mode of operation during an interruption interval in a second flow direction opposite to the first flow direction to convey a subset of the actual quantity of the actual number of sample subsets conveyed in the second flow direction. In this way, the partial quantity of the sample subsets accumulated up to that point is removed and it can be ensured that sample subsets can continue to be conveyed along the first conveying direction in the further course of the conveying interval.

In a third configuration of the second aspect, the second mode of operation further includes mixing the actual quantity collected in a sample container before operating the pump in the interruption interval. This ensures the representativeness of the accumulated sample subsets even after the interruption interval.

In a fourth configuration of the second aspect, the method includes updating the operating rate of the pump based on a remaining actual quantity after the interruption interval. This allows the operation of the pump to be adapted to the previous course of the conveying interval. Consequently, the representativeness of the total milk milked by the end of the milking process is improved, since updating the operating rate after the interruption interval ensures that a residual filling in the current milking process after the interruption interval is representative of the sample subsets to be split off by the end of the milking process.

In a fifth configuration of the second aspect, the method comprises updating a number of sample pulse intervals based on the measured quantity after at least one sample pulse interval in the first mode of operation. This allows an adjustment of the operation of the pump on the basis of the measured quantity without using further data, such as data from a history of past conveying intervals.

In a sixth configuration of the second aspect, the specific operating rate in the first mode of operation specifies that a predetermined sample subset is pumped three times per minute. This means that the sampling is started with a uniform, tendentially high splitting rate for sample subsets, whereby a favorable dissolution of the sample is provided at the beginning of the flow interval.

In a seventh configuration of the second aspect, the method further comprises operating the pump in a third mode of operation after the first mode of operation has been completed, the pump being operated in the third mode of operation at a flushing interval for conveyance along the second conveying direction. This allows any remaining milk residues to be removed after the sample container has been removed at the end of the first mode of operation, which solves the carry-over problem.

In at least some of the configurations of the first and second aspects of the invention described above, the following advantages of the invention are achieved:
i) Since an actively conveying pump is provided for sampling, this type of sampling is neither dependent on an external dynamic back pressure nor on an external hydrostatic pressure that drives the splitting-off. Samples can therefore also be taken upstream of a quantity measurement chamber, especially where the supply of milk currently being milked is always and exclusively provided. This significantly reduces the risk of carry-over.
ii) In some configurations, the carry-over problem can be largely eliminated by placing the pump in front of a quantity measurement chamber and briefly (e.g. 5 sec.) switching the pump to reverse at the beginning of a milking process: At the new start of milking, any milk residues from the last animal, which may still have been in the long milk hose, flow into the apparatus, but their inlet side is effectively rinsed free (blown empty) when the pump runs backwards, so that only fresh milk is sucked in by the new animal in the subsequent forward direction of rotation. Consequently, no milk from the last animal enters the sample taken when milking a subsequent animal.
iii) Furthermore, there is a much greater independence from pressure conditions between a sample container, e.g. an analysis bottle, and a quantity measurement chamber, and in particular also an independence from the vacuum fluctuations in the feed line that are common during milking. If necessary, it would even be technically possible to transfer the milk sample from the device under milking vacuum into a sample bottle that does not have to be under vacuum. This means that there are no more sealing problems with the bottle and no pull-off force is required. Consequently, the risk of spillage during sampling is avoided.
iv) In order to minimize power consumption and for optimum protection of the split-off milk (fat globules), a quasi pressureless pumping is preferred, i.e. practically only "active forward scooping" of sample subsets without pressure peaks. For example, this can be implemented with the aid of a slowly rotating positive displacement pump (e.g. gear pump).
v) There are no start-up difficulties and the risk of blockage, sticking and clogging is significantly reduced by powerful forced conveying (see characteristics of a DC motor in braked condition).
vi) The sample subsets are of variable size, which can be set to a duty cycle and/or pump speed (e.g. 3 gears using voltage control via pulse width control).

SHORT DESCRIPTION OF THE FIGURES

Further advantageous effects and embodiments of the invention result from the following detailed description regarding the enclosed Figures in which.

DETAILED DESCRIPTION

In this description, reference is sometimes made to an interval. In general, an interval is a period of time with a beginning and an end or beginning/end with a (finite) length (corresponds to the amount of a difference between beginning and end) or a point in the interval, a so-called support point, and associated distances from this point in the interval to the beginning and end of the interval. In particular, for two points in time from an interval, all points in between should also belong to the interval.

Figure 1:
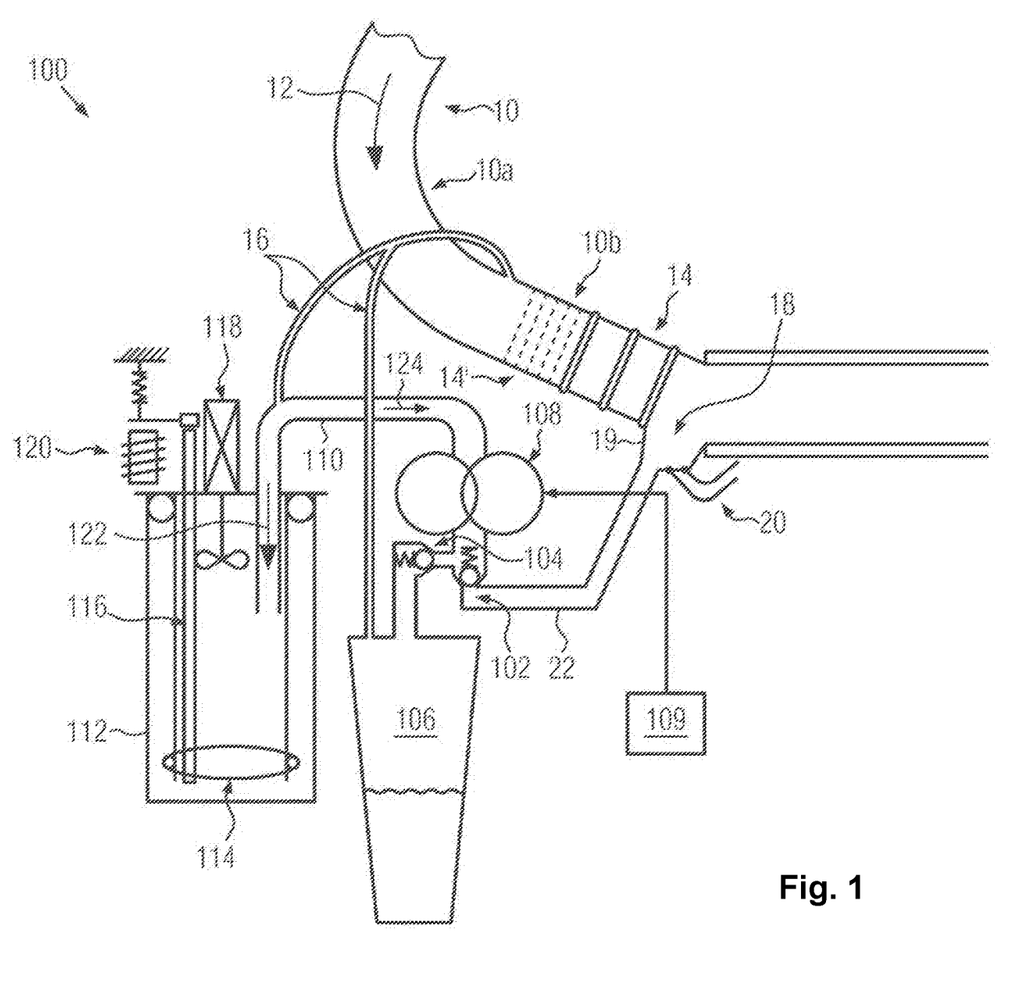
FIG. 1 schematically represents a sampling apparatus according to some illustrative embodiments of the invention.

With reference to FIG. 1, some illustrative embodiments of the invention relating to a milking device are described in greater detail.

FIG. 1 shows schematically a sampling apparatus 100 according to some illustrative embodiments of the present invention. The sampling apparatus 100 is connected to a milk hose 10. The milk hose 10 can represent e.g. a short milk hose placed between a teat cup (not shown) and a collection piece (not shown) or a long milk hose placed between a collection piece (not shown) and a collection container (not shown). The milk hose 10 is flown through by the milk flow along a direction 12.

According to some illustrative embodiments, the section of the milk hose 10 shown in FIG. 1 can optionally have a tightly bent inlet pipe 10a, for example with a bending radius smaller than three times the internal diameter of the inlet pipe 10a, which is connected to a downstream measuring section 10b. The inlet pipe 10a can, for example, merge seamlessly into the measuring section 10b. In particular, a diameter of the measuring section 10b can be equal to a diameter of the inlet pipe 10a.

According to some illustrative embodiments, the measuring section 10b can have two ring electrodes 14, which are electrically insulated from each other and through which milk guided in the milk hose 10 flows. In an illustrative example, the ring electrodes 14 are spaced from each other by a defined distance along direction 12, for example with a distance between 5 mm and 7 cm, preferably in a range between 5 mm and 35 mm, more preferably in a range between 10 mm and 25 mm, approximately at 20 mm. This enables a flow rate sensor to be provided which functions as follows: a milk flowing in the milk hose 10 fills the cross-section of the measuring section 10b to different degrees depending on the flow rate of the milk in the milk hose 10, in particular the measuring section 10b is filled to different degrees by the milk flowing in the milk hose 10 depending on the flow rate of the milk in the measuring section 10b. Thus, depending on the flow rate, a contact surface between the milk flowing in the milk hose 10 and the ring electrodes 14 changes, and measured values for a conductivity of the milk flowing in the milk hose 10 are obtained, which are recorded by the ring electrodes 14. Taking into account the geometrical conditions in the measuring section 10b, a quantitative relationship can be established between the conductivity measured by the ring electrodes 14 and the flow rate of the milk in the milk hose 10 at the measuring section 10b, for example by carrying out a calibration measurement, whereby this relationship, together with a measured value measured by the ring electrodes 14, can give a corresponding value for the flow rate of the milk in the milk hose 10. For example, a corresponding connection can be provided by a lookup table or LUT, which can be stored in a memory device (not shown). By adding a further, also spaced apart, optional pair of ring electrodes 14' (shown dashed in FIG. 1) in the measuring section, the velocity of the milk flowing through the conveying line 10 at the measuring section 10b can also be determined by measuring the time interval between contact of the milk with the pair of ring electrodes 14' and with the pair of ring electrodes 14. Since the flow in a milking system is not usually completely even, but rather in the form of swelling and subsiding plugs, these can be used as trigger points for a velocity measurement through ring electrode pairs 14, 14'. The sequence of pairs of spaced apart ring electrodes 14 and 14' shown in FIG. 1 is merely exemplary and does not constitute a limitation of the invention. Alternatively, a sequence of pairs of ring electrodes 14 and 14' may be reversed.

In an alternative embodiment, the measuring section 10b may have three spaced apart ring electrodes for determining the conductivity as well as the flow velocity, whereby one ring electrode of the pair of ring electrodes 14 shown in FIG. 1 or one ring electrode of the pair of ring electrodes 14' shown in FIG. 1 is not provided. In a specific illustrative example herein, in addition to the pair of ring electrodes 14, a further spaced apart ring electrode (e.g. one of the pair of ring electrodes 14') may be provided, the middle ring electrode of these three spaced ring electrodes being usable as a common electrode for conductivity measurement and for flow velocity measurement.

In embodiments in which the inlet pipe 10a is provided, air transported in the milk hose 10, which is transported through the milk hose 10 together with the milked milk flowing in the milk hose 10 and thus forms a milk/air mixture in the milk hose 10, can be separated before entering the measuring section 10b, so that a flow rate of the milk flowing in the milk hose 10 can be determined more accurately, provided that a more accurate determination of the flow rate of the milk is desired.

According to some illustrative embodiments, a settling chamber 18 is arranged downstream of the measuring section 10b, in which, in a cup-like depression 19 arranged at the bottom of the settling chamber 18, optionally point electrodes 20 can be located for conductivity measurement of the settled pure milk located in the cup-like depression 19. On the basis of the measured values of the ring electrodes 14, which determine a conductivity value of milk in an air/milk mixture in the measuring section 10b, a comparison value can be determined on the basis of measured values recorded by the point electrodes 20 in the cup-like depression 19 of the settling chamber 18, so that the proportion of air in the milk/air mixture recorded in the measuring section 10b can also be calculated.

According to some illustrative embodiments, a connection line 22 is led away at the cup-like depression 19, for example at the bottom of the cup-like depression 19. The connection line 22 is connected to a pump 108 of the sampling apparatus 100 and is adapted to take milk samples from the milk hose 10, as explained in more detail below. This is not a limitation of the present invention and the connection line may be branched off from the milk hose 10 at another point.

In exemplary embodiments, the sampling apparatus 100 further comprises a controller 109, which is adapted to control an operation of the pump 108. The controller 109 can be connected to the ring electrodes 14 and/or the point electrodes 20 to receive measured values from the connected electrodes 14 and/or 20.

According to some illustrative embodiments, the controller 109 can be adapted to determine a flow rate of the milk flowing in the milk hose 10 through the measuring section 10b on the basis of the measured values obtained and/or to take into account the proportion of air and/or the flow rate according to the above explanations. Alternatively, the controller 109 can be connected to an electronic evaluation unit (not shown), which determines a flow rate on the basis of measured values of the ring electrodes 14 and transmits this to the controller 109. Optionally, the flow rate determined by the electronic evaluation unit (not shown) can be offset before or after it is transmitted to the controller 109 with measured values of the point electrodes 20 to obtain a flow rate adjusted for air and flow velocity.

According to some alternative embodiments, the controller 109 can be designed to receive the measured values recorded by the ring electrodes 14. Here the controller 109 can be adapted to store a current measured value in an internal or external memory device (not shown) as an actual value and to compare it with at least one previous actual value. For example, a comparison between an actual value and at least one previous actual value can be made in such a way that the current actual value is at least related to a previous actual value, for example by forming a quotient and/or a difference. Based on this relationship, a comparison between different flow rates can be made without directly determining absolute values for flow rates. For example, a control of the pump 108 by the controller 109 can, without great effort with regard to an electronic evaluation in the controller 109, be carried out by means of a quotient and/or a difference of actual values, wherein a memory device (not shown), e.g. a DRAM device or an SRAM device or a flash memory device, is provided in the controller 109, which at least temporarily stores the current actual value and at least one previous actual value.

Since measured values detected by the ring electrodes 14 represent a measure of a flow rate, as can be established according to the above description on the basis of a previously determined relationship, no explicit distinction is made in the following between the measured value and the flow rate. Further details of controller 109 are described in detail below.

In some illustrative embodiments, a non-return valve 102 can be placed between the pump 108 and the milk hose 10, which blocks a flow of milk directed from the pump 108 to the milk hose 10 and is open for a flow of milk directed from the milk hose 10 to the pump 108. Between the non-return valve 102 and the pump 108 a branch is formed in the connection line 22, which is in fluid connection with a waste container 106. A further non-return valve 104 is arranged between the pump 108 and the waste container 106, which is open for a flow of milk directed from the pump 108 to the waste container 106, so that milk can flow in this direction to the waste container 106, but a flow of milk in the opposite direction, in particular from the waste container to the non-return valve 102, is blocked. This does not constitute a limitation of the invention and, alternatively, a branch may be formed in the connection line 22 between the non-return valve 104 and the pump 108, which is in fluid connection with the milk hose 10 via the non-return valve 102.

According to an exemplary embodiment, the sampling apparatus 100 can also have a sample container receptacle 112, which is adapted to receive a sample container (not shown), for example an analysis bottle. The sample container receptacle 112 can be connected to the pump via a connection line 110, whereby the connection line 110 extends from the pump 108 to a sample container (not shown), which is placed in the sample container receptacle 112 during operation of the sampling apparatus 100. In general, the connection line 110 alone or together with the sample container receptacle 112 can be a sample container connection element.

According to a special illustrative example, the sample container receptacle 112 can have a centering ring 114 for a sample container, so that a sample container (not shown) can be placed in the sample container receptacle 112 in a precisely defined manner. This provides a reliable connection between the sample container receptacle 112 and a sample container (not shown), avoiding leaks and unwanted leakage of sample liquid during sampling.

According to some illustrative embodiments, an air inlet 116 or alternatively/additionally a stirrer 118 as a mixing device or mixer can be arranged at the container receptacle 112 to mix sample liquid filled into a sample container (not shown) using the air inlet 116 and/or the stirrer 118 during operation of the sampling apparatus 100. For example, the air inlet 116 can be connected to an air reservoir (not shown) via a solenoid valve 120 in order to introduce air into a sample container (not shown) in a controlled manner via the air inlet 116 for mixing.

Furthermore, in some illustrative embodiments, ventilation hoses 16 can also be connected to the sample container 112 and/or the waste container 106 in order to avoid an undesired pressure increase in the waste container 106 and/or a sample container (not shown).

In the following an operation of pump 108 is described in more detail.

According to some illustrative embodiments, the pump 108 can be operated in such a way that it can convey a liquid present in connection line 22 along two opposite conveying directions 122 and 124. For example, in a mode of operation of the pump 108, milk can be transported via the connection line 22 from the milk hose 10 through the pump 108 along the conveying direction 122 through the non-return valve 102 into the sample container receptacle 112 and in particular a sample container (not shown) arranged in the sample container receptacle 112.

In a further mode of operation of the pump 108, accumulated milk in a sample container (not shown) inside the sample container receptacle 112 can be transported by the pump 108 along the conveying direction 124 via the non-return valve 104 into the waste container 106.

In exemplary embodiments, the sampling apparatus 100 for taking a representative milk sample in a predetermined quantity range, in particular a volume of a sample container (not shown), for example an analysis bottle with a volume of 40 to 50 ml, is conveyed from a milk hose 10 in a milking process of unknown length, in particular the milking time at the beginning of a milking process is not known.

According to illustrative examples, the pump 108 is a displacement pump, for example a gear pump, a rotary piston pump, a vane pump, an impeller pump, a peristaltic pump, a piston pump or a diaphragm pump. According to preferred examples, the pump is a gear pump, for example a very slowly rotating gear pump with comparatively large teeth so that sensitive fat globules in the pumped representative milk samples are not damaged, or a hose pump.

In a non-restrictive example, a gear pump used according to some illustrative embodiments may have a number of teeth in the range 10 to 15, e.g. 12, with a modulus between 0.5 and 1, e.g. 0.7. In illustrative examples herein, a tooth width can be in the range of 2 mm to 7 mm, e.g. 5 mm. In further illustrative examples herein, a pitch circle diameter can be in the range of 5 to 10 mm, e.g. 8.4 mm. In further illustrative examples herein, a flow rate can be in the range of 20 to 100 ml/min. In further illustrative examples herein, a speed of rotation can be in the range of 1.5 to 8 revolutions per second.

In illustrative examples, the controller 109 may include or be associated with a microprocessor (not shown) configured to receive data from a flow rate sensor. In illustrative examples, the controller 109 may include or be connected to a microprocessor configured to receive data from the ring electrodes 14 on the measuring section 10b and/or the point electrodes 20 in the settling chamber 18. According to a non-restrictive illustrative example, the controller 109, as described above, can be configured to determine an actual value of the flow rate in the milk hose 10 from received measured values of the flow rate sensor 14 and/or the point electrodes 20 or to receive an actual value of the flow rate determined by an evaluation device external to the controller 109. A current actual value is to be understood as a currently measured value and/or a variable derived from the currently measured value, e.g. a flow rate, conductivity, quantity and the like. For example, measurement data is provided with a time indicator so that measurement data can also be assigned to times that indicate a point in time when measurement data was recorded. In addition or alternatively, the current actual value can represent an adjusted current actual value in which the air content in a milk/air mixture inside the milk hose 10 and/or the flow rate is calculated out as described above. Furthermore, a previous actual value is to be understood as an actual value stored at least temporarily in a memory device (not shown), which results from a measurement preceding a current actual value and was stored in the memory device (not shown). For example, a stored value can be assigned a time value during its storage, which can be indicative of a time of storage or a time indicator of the measurement, for example. On the basis of the current actual value, the controller 109 can then, as described above, control an operation of pump 108 by determining, for example, sample pulse intervals in which a discrete sample subset is conveyed along the conveying direction 122 to the sample container receptacle 112, with regard to their length and frequency in an operation of pump 108.

According to illustrative embodiments, a frequency of sample pulse intervals can be defined by a corresponding distribution of the support points of intervals over a standard time interval, for example one minute. For example, a three times sampling of sample subsets in a standard interval of one minute is set by arranging support points at intervals of 20 seconds. Of course, the interval length has to be taken into account here, in particular, the frequency is only well defined as long as a distance between two successive support points per standard interval is greater than the smallest interval length from the interval lengths assigned to these two support points.

In illustrative embodiments, the operation of the pump 108 corresponds to a pulsed operation in which the pump 108 conveys a discrete sample subset during individual sample pulse intervals. A total number of discrete sample subsets pumped by the pump 108 in one milking process over the entire milking time then corresponds to a total volume of a representative milk sample taken during the milking process. In order to prevent an overflow of a sample container (not shown) in the sample container receptacle 112 during sampling in a milking process, the total volume of a representative milk sample to be conveyed in the milking process as a whole in the conveying direction 122 shall be less than or equal to the predetermined quantity range of a representative milk sample, in particular a predetermined volume of a sample container. According to illustrative examples, a given quantity range can be in a range up to 40 ml or up to 50 ml.

A volume of a discrete sample subset can be determined by adjusting the conveying velocity of pump 108 along the conveying direction 122. For example, a fixed flow rate can be predetermined for the pump 108 in the sample pulse intervals (without taking into account the switching on and off of the pump). Alternatively, a conveying velocity of the pump 108 can depend on an actual value of the flow rate of the milk in the milk hose 100 and/or a current totally split-off quantity of sample subsets. In an illustrative but not limiting example, a velocity of the pump 108 may, for example, depend on a point in time within a milking process, e.g. a conveying velocity of the pump may be reduced according to a decreasing flow rate of the milk conveyed in the milk hose 10. For example, the pump 108 can have at least two different flow rates, wherein one of the at least two different flow rates can be selected depending on an actual value of the flow rate.

In addition or alternatively, a frequency of the sample pulse intervals can be set depending on the flow rate of the milk conveyed in the milk hose 10, for example, the frequency can increase according to an increasing flow rate and decrease according to a decreasing flow rate. According to illustrative examples, for example, a frequency of the sample pulse intervals (depending on a length of the sample pulse intervals) can be set to at least three sample pulse intervals per minute. If necessary, the velocity of the pump 108 can be adjusted accordingly in order to set a desired frequency of sample pulse intervals per minute by reducing the length of the sample pulse intervals while simultaneously increasing the conveying velocity, e.g. while maintaining the sample subset conveyed in one sample pulse interval.

According to illustrative embodiments, a fixed initial value for the velocity of pump 108 and/or an initial sample pulse interval can be stored in the controller 109. After at least one initial sample pulse interval has been carried out, the controller 109 can correct the operation of the pump 108 on the basis of an actual value of the flow rate of the milk conveyed in milk hose 10 in such a way that an updated sample pulse interval is defined which is used as a basis for the further operation of pump 108. It is also possible to update an originally set initial frequency of sample pulse intervals per minute. In this way, a sampling can be adjusted to the current milk flow and thus to an approximate time in a milking process on the basis of an actual value of the current milk flow in the milk hose 10.

In illustrative examples, a frequency of sample pulse intervals per minute with decreasing milk flow in the milk hose 10 (may indicate an end of a milking process), can be increased so that a number of discrete sample subsets can be increased towards the end of a milking process where there is a low milk flow with a very high fat content. As a result, undesirable major discrepancies in the determination of the fat content of a total milk can be avoided by this method of sampling.

Furthermore, by adjusting the conveying velocity of the pump 108 to set a volume of a discrete sample subset in the sample pulse intervals, it is not necessary to distribute the sample pulse intervals evenly over the (initially unknown) milking time. For example, a low or minimal number of sample pulse intervals per minute can be initially assumed and, due to the measurement of the flow rate of the milk conveyed in the milk hose 10, can be increased depending on an actual value of the flow rate of the milk conveyed in the milk hose 10. For example, in addition or alternatively, a conveying velocity of the pump 108 can be increased from an initially low or minimum conveying velocity 108 depending on an actual value of the flow rate of the milk conveyed in the milk hose 10.

According to some exemplary embodiments, a finer resolution at the end of a milking process with low milk flows and high fat content is achieved by reducing a conveying speed of the pump 108 towards the end and increasing a frequency of sample pulse intervals. Alternatively, a length of sample pulse intervals towards the end of milking can be reduced while the conveying velocity of pump 108 remains the same or increases.

In some illustrative embodiments, the pump 108 can be operated continuously at a low flow rate along flow direction 122 within a sample pulse interval in order to split off a representative milk sample quasi-continuously over a milking process. In this process, a very large number of discrete sample subsets are obtained over a milking process, which can be considered quasi-continuous for continuous operation of pump 108 at low flow rates.

In another mode of operation, the pump 108 is configured to convey milk along the conveying direction 124 via the non-return valve 104 to the waste container 106.

According to illustrative embodiments, the controller 109 detects a filling level of a sample container arranged in the sample container receptacle 112 (not shown). This can be determined, in accordance with some illustrative examples herein, by summing up or integrating the sample subsets previously conveyed by the pump 108 along the conveying direction 122, whereby a quantity of a single discrete sample subset can be determined by means of the conveying velocity of the pump 108. In addition or alternatively, a sensor (not shown) can be provided on the sample container receptacle to determine a filling level of a sample container in the sample container receptacle 112 or to detect an exceeding of a critical filling level in sample containers (not shown). When a certain critical value is detected with regard to the filling level of a sample container (not shown) and/or a cumulative sample subset that has been conveyed up to that point, the controller 109 carries out a check using an actual value of the flow rate of the milk conveyed in the milk hose 100 to determine whether a milking process is coming to an end or an end of a current milking process can be estimated (for example, by the actual value falling below a pre-defined limit value, which estimates an end of the milking process—this limit value can be defined in advance in the control system or entered by a user based on experience) and how many further discrete sample subsets are to be conveyed up to that point. If the estimation of this shows that the given quantity range of the representative milk sample is exceeded in this estimation, the pump starts the further mode of operation, which is called interruption mode of operation in the following. In this case, the controller 109 of the pump 108 is configured to control operation of the pump 108 in interruption mode so that a partial quantity of the actual quantity of the actual number of sample subsets conveyed is conveyed in an interruption interval in the conveying direction 124. This means that the pump 108 in particular is operated in the interruption interval in such a way that the partial quantity is fed in particular to the waste container 106. A volume of the connection line 22 from the sample container (not shown) to the non-return valve 104 can be taken into account to ensure that a well-determined partial quantity is reliably supplied to the waste container 106 during the interruption interval.

According to some illustrative embodiments, the controller 109 after an end of the interruption interval is configured to update a number of sample pulse intervals for the remaining duration of the current milking process and/or a size of the sample pulse intervals after the interruption interval based on a remaining actual quantity in the sample container. In this case, an actual quantity in the sample container corresponds to a difference from the actual quantity of the actual number of sample subsets conveyed before the execution of the interruption interval minus the partial quantity removed. For example, the partial quantity can be taken in such a way that about half of the actual quantity or half of the predetermined quantity range is present in the sample container (not shown) after the interruption interval. According to special illustrative examples, an actual quantity of 15 ml to 35 or 40 ml, preferably 15 ml to 30 ml, more preferably 20 ml to 25 ml, can remain for a sample container with a given quantity range up to 40 ml or up to 50 ml.

In illustrative embodiments, the controller is configured to update a filling level in the sample container (not shown), if this is not detected by a sensor (not shown) arranged on the sample container receptacle 112, by subtracting the partial quantity conveyed in the conveying direction 124 in the interruption interval from the summed quantity of sample subsets.

According to some illustrative embodiments, the controller 109 may also be adapted to operate a mixing device, in particular the air inlet 116 and/or the stirrer 118 in the interruption mode of operation before the interruption interval is performed, in order to mix the actual quantity collected in a sample container (not shown) before the interruption mode of operation. This ensures that the partial quantity in the interruption interval is taken from a homogeneous mixture and the remaining actual quantity is still representative of the interruption interval for the cumulative discrete sample subset collected up to that point.

According to some illustrative embodiments, the controller 109 can be designed to repeat the above described interruption mode several times. This ensures that a representative milk sample in a given quantity range is reliably split-off during a milking process with a previously unknown length and that no overflow of a sample container (not shown) occurs in the sample container receptacle 112 during sampling. Here, preferably after each interruption mode of operation, the filling level is updated or each interruption interval along the direction of flow 124 is calculated by integrating the sample subsets collected up to that point with the conveyed subsets that are considered negative.

Figure 2:
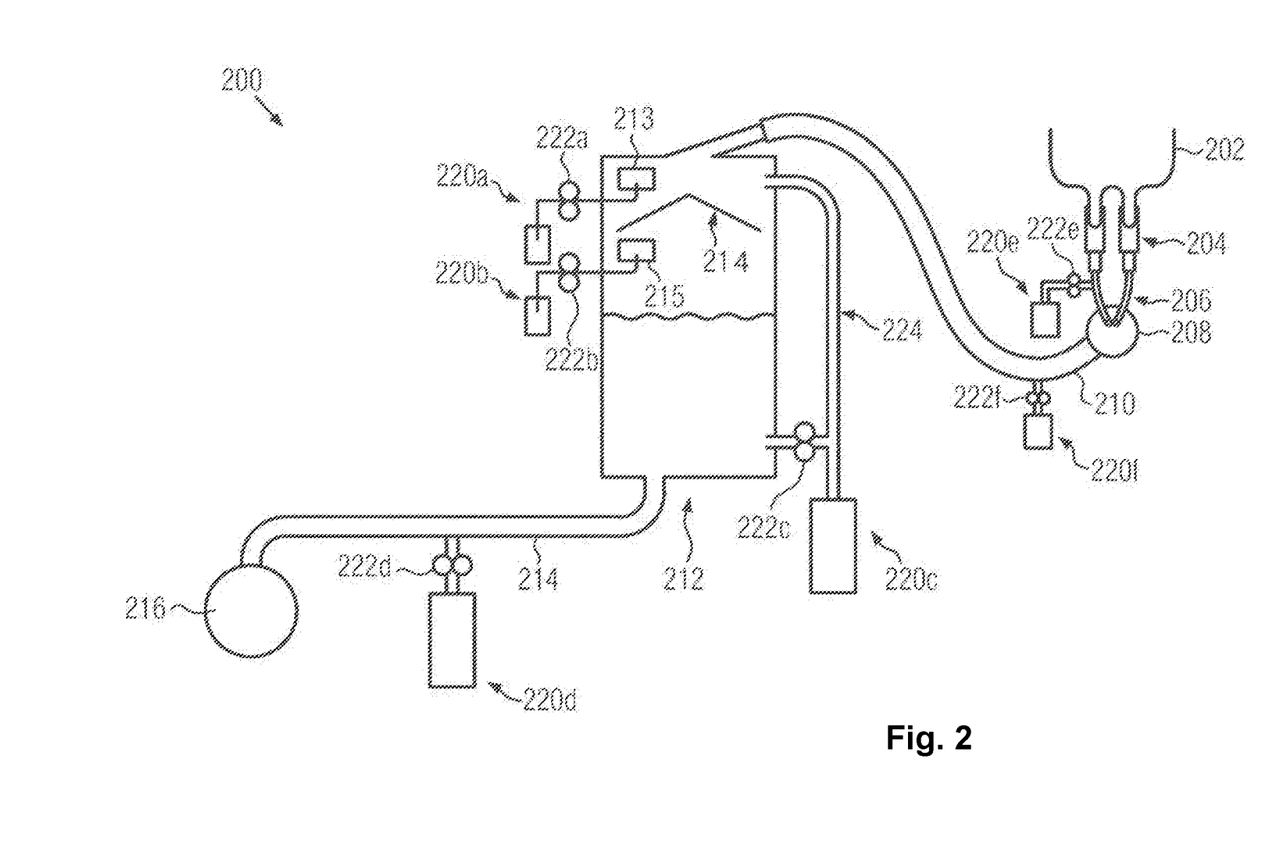
FIG. 2 schematically represents a milking device with at least one sampling apparatus according to some illustrative embodiments of the invention.

With reference to FIG. 2, possible positions of the sampling apparatus 100 described above in FIG. 1 are described in accordance with various illustrative embodiments of the invention.

FIG. 2 shows a milking device 200 with a plurality of teat cups 204, which are connected to a collection piece 208 via short milk hoses 206. The collection piece 208 is connected via a long milk hose 210 to a collection container 212, which is connected via a milk line 214 to a milk pump 216, which applies a milking vacuum to the teat cups 204 during a milking process. This means that, during a milking process, one udder 202 of a cow (not shown) is milked. The milking equipment 200 may include at least one sampling apparatus as described above. A vent 224 may be provided on the sampling apparatus 220a-d, as shown schematically in FIG. 2. The vent 224 can cause the pressure between the sampling apparatus 220a-d and the collection container 212 to be approximately equal.

According to some illustrative embodiments, a sampling apparatus 220a can be arranged on the collection container 212. For example, the sampling apparatus 220a may be located at the inlet of the collection container 212, with an overflow basin 213 located at the inlet of the collection container 212, into which milk from the long milk hose 210 enters, overflows the overflow basin 213 and collects at the bottom of the collection container 212. At the bottom of the overflow basin 213, a small outlet hole may be provided, which opens into the collection container 212, ensuring that the content in the overflow basin 213 is continuously exchanged and that the overflow basin is emptied at the end of milking. At the bottom of the overflow basin 213, a representative milk sample can be taken by means of a pump 222a, which may be the same as the pump 108 described above, in accordance with the description above for sampling apparatus 100.

In addition or alternatively, a sampling apparatus 200b may be arranged below a splashboard 214 in the collection container 212, whereby milk supplied through the long milk hose 210 bounces off the splashboard 214, flows off along it and collects at the bottom of the collection container 212. A further collecting basin 215 may be located underneath the splashboard 214, which collects part of the milk draining off at splashboard 214. At the bottom of this further collection basin 215 there may be a connection pipe to a pump 222b, which may correspond to the pump 108 described above.

In addition or alternatively, a sampling apparatus 220c corresponding to the sampling apparatus 100 described above can be arranged at the bottom of the collection container 212, whereby a connection line led outwards from the collection container 212 via a pump 222c can take a representative milk sample as described above with regard to FIG. 1. Since the conveying rate of pump 222c is not affected by the pressure at its inlet, the storage level of the milk collected in collection container 212 (hydrostatic pressure) is not important for the function of the sampling apparatus.

In addition or alternatively, a sampling apparatus 220d can be arranged in a milk line after the collection container 212, which can take a representative milk sample via a pump 222d. The 222d sampling apparatus may be the same as the sampling apparatus 100 described above.

In addition or alternatively, a sampling apparatus 220e may be arranged on a short milk hose 206 between a teat cup 204 and the collection piece 208 in order to take a representative milk sample by means of a pump 222e. The sampling apparatus 222e can correspond to the sampling apparatus 100 described above.

In addition or alternatively, a sampling apparatus 220f can be arranged on a long milk hose 210, which is used to take a representative milk sample by means of a pump 222f. The sampling apparatus 222f may correspond to the sampling apparatus 100 described above.

Figure 3A:
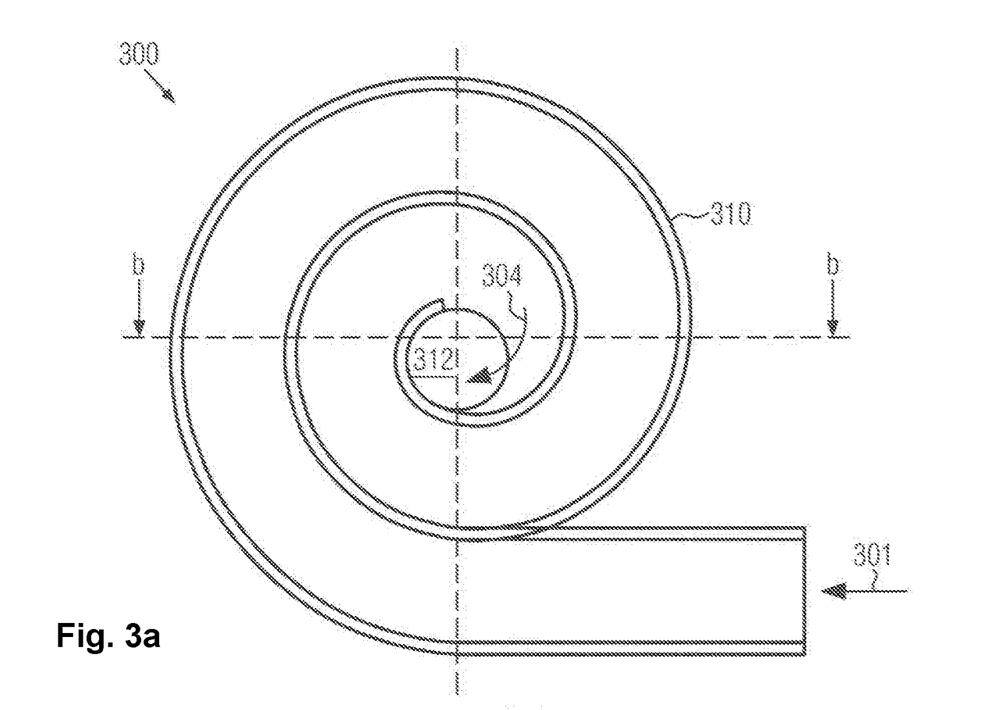
FIGS. 3a and 3b schematically represent a flow rate sensor according to some embodiments of the invention.
Figure 3B:
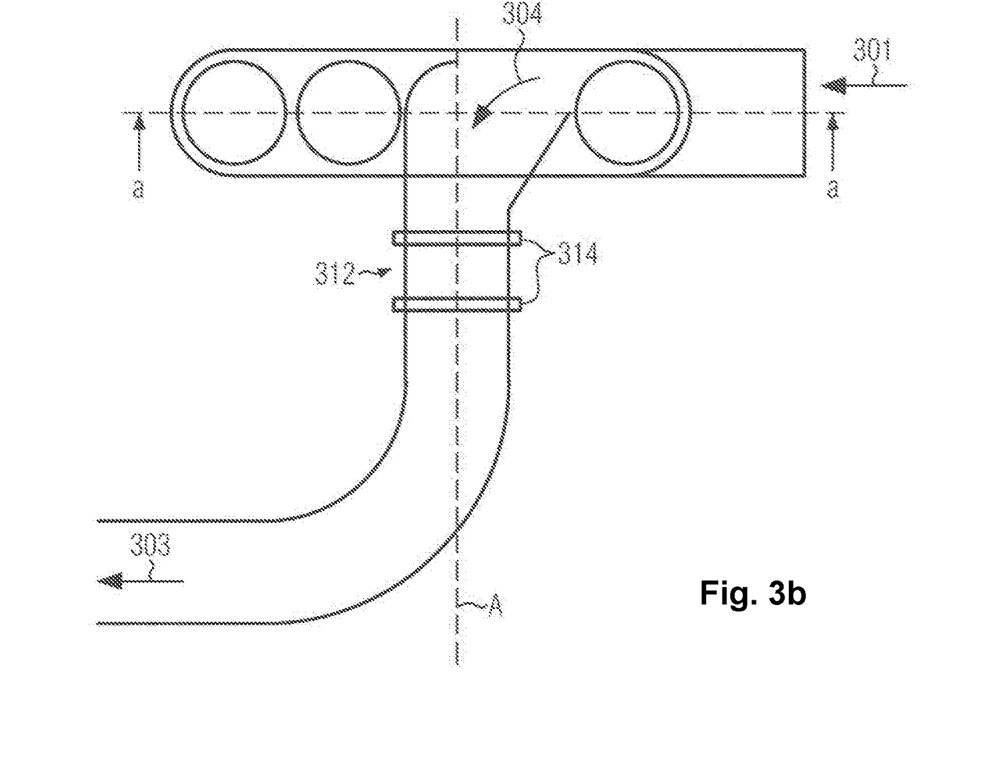

With reference to FIGS. 3a and 3b, a flow rate sensor 300 is described according to some illustrative embodiments of the present invention. Here FIG. 3a shows a view of the flow rate sensor 300 along a vertical direction and FIG. 3b shows a horizontal side sectional view of the flow rate sensor 300 along the intersection line a-a in FIG. 3a, the intersection line a-a from FIG. 3a being drawn as an orientation guide in FIG. 3b.

The flow rate sensor 300 can, for example, be connected to a short milk hose (not shown), a long milk hose (not shown) or a milk line (not shown). For example, the flow rate sensor 300 can be arranged in the short milk hose (not shown), in the long milk hose (not shown) or in the milk line (not shown) in such a way that an inflow into the flow rate sensor 300 comes from the short milk hose (not shown), flows into the long milk hose (not shown) or out of the milk line (not shown) along an arrow 301 and leaves the flow rate sensor 300 along an arrow 303 to re-enter the short milk hose (not shown), long milk hose (not shown) or milk line (not shown). Thus the flow rate sensor 300 is completely flown through by the milk flow during a milking process.

According to some illustrative embodiments, the flow rate sensor 300 is designed in the form of a horizontally oriented spiral 310, e.g. an Archimedean spiral, so that a milk flow fed to the flow rate sensor 300 flows through the spiral 310 in a substantially horizontal plane from the outside to the inside. This causes an acceleration of the angular velocity of the milk flow along the spiral 310, so that the milk flow is introduced into a measuring section 312 following downstream of the spiral 310 with an azimuthal acceleration component with respect to an axis A of the measuring section 312.

In illustrative embodiments, the measuring section 312 can have a pair of ring electrodes 314, which can be designed similarly to the ring electrodes 14 described in FIG. 1 above. The ring electrodes 314 can be arranged to measure a conductivity of the milk flow flowing through the ring electrodes 314. The azimuthal component of the acceleration at the input of the measuring section 312 results in the measuring section 312 being completely covered azimuthally by a milk film and thus a stable and sensitive measurement of the present electrical resistance of the ring electrodes 314 through which the flow passes can be carried out.

A connection line (not shown) can be provided on the measuring section 312, which is designed similarly to the connection line 22 in FIG. 1 above and to which a sampling apparatus (not shown in FIGS. 3a and 3b) is coupled, similar to the sampling apparatus 100 in FIG. 1. According to some illustrative examples a sampling can also take place directly at the flow rate sensor 300.

In some illustrative embodiments, at least one additional ring electrode (not shown) may be provided to form a velocity sensor as described with respect to FIG. 1 above. Here reference is made to the corresponding description with respect to FIG. 1.

Figure 3C:
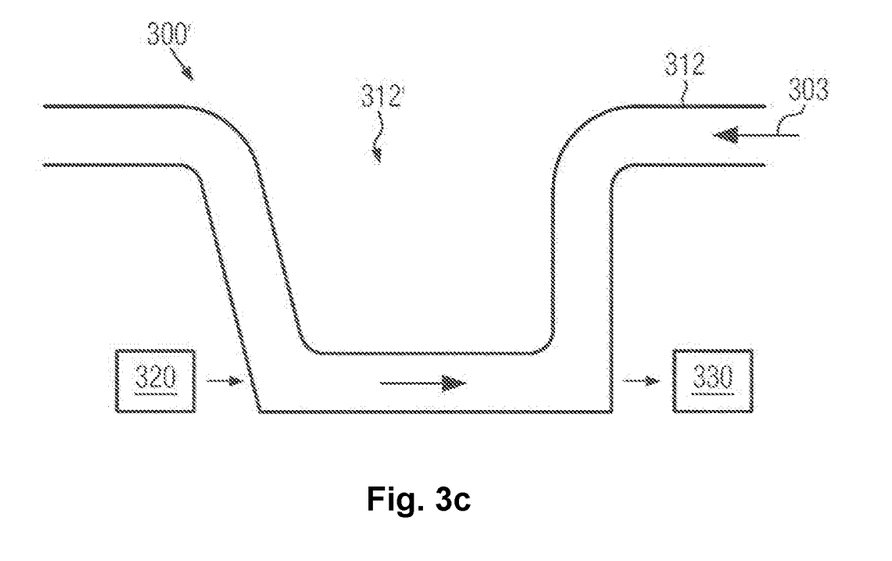
FIG. 3c schematically represents a flow rate sensor according to some alternative embodiments of the invention.

In some alternative embodiments, the flow rate sensor 300 can also be designed as an optical sensor. FIG. 3c shows an optical flow rate sensor 300' which may be provided as an alternative to the ring electrodes 314 in FIG. 3b, whereby the optical flow rate sensor 300' may be located below the Archimedean spiral corresponding to the arrows 303 in FIGS. 3b and 3c. The conduit 312 may have an optical measuring section 312', which may be U-shaped, and wherein on opposite sides of the measuring section 312' a light source 320, for example in the form of a light-emitting diode or a laser diode or the like, and a light detector 330, for example a photocell or a photoresistor or the like, may be mounted. The facing ends of the measuring section 312' on the side of the light source 320 and the side of the light detector 330 may be formed by elements or have material sections which are transparent at least in a section of the light emitted by the light source (not shown). For example, a window section (not shown) can be formed on opposite sides of the 312' measuring section.

During operation of the flow rate sensor 300', a light beam or alternatively a light pulse of defined length is continuously generated by the light source 320, which passes through the measuring section 312', exits at the opposite end of the measuring section 312' and falls on the light detector 330, as schematically indicated by arrows in FIG. 3c. Thus, a measured variable, such as an electric current, is detected in the light detector 330. If milk now flows through the measuring section 312' during a measurement, light is absorbed, which is detected by the light detector 330. For example, the absorption of light by milk causes an electric current flowing through the light detector 330 to be reduced. Since the degree of light absorption within the measuring section 312' depends on a layer thickness of the milk flowing through the conduit 312, a measurement of a measurement representing the degree of light absorption can thus provide a quantitative measure of the flow of milk through the conduit 312, e.g. a quantity of milk flowing through the conduit 312 within a measuring time.

In an alternative embodiment, an optical flow rate sensor corresponding to the optical flow rate sensor 300' in FIG. 3c can be arranged on the measuring section 312 in FIG. 3b in addition to or as an alternative to the ring electrodes 314. For example, a light source (not shown in FIG. 3b) corresponding to light source 320 in FIG. 3c is located on one side of the conduit at measuring section 312, and a light detector (not shown in FIG. 3b) corresponding to light detector 330 in FIG. 3c is located on another side of the conduit at measuring section 312, so that the light source and the light detector are opposite to each other and are facing each other. At measuring section 312, the conduit is at least partially optically transparent to radiation that can be detected by the light detector and is emitted by the light source. For example, two optically transparent sections are formed in the measuring section, which are penetrated by an optical axis which is directed from the light source to the light detector and along which the light detector can detect radiation emitted by the light source, the optical axis being oriented transversely to an axis of the conduit at measuring section 312.

Figure 4:
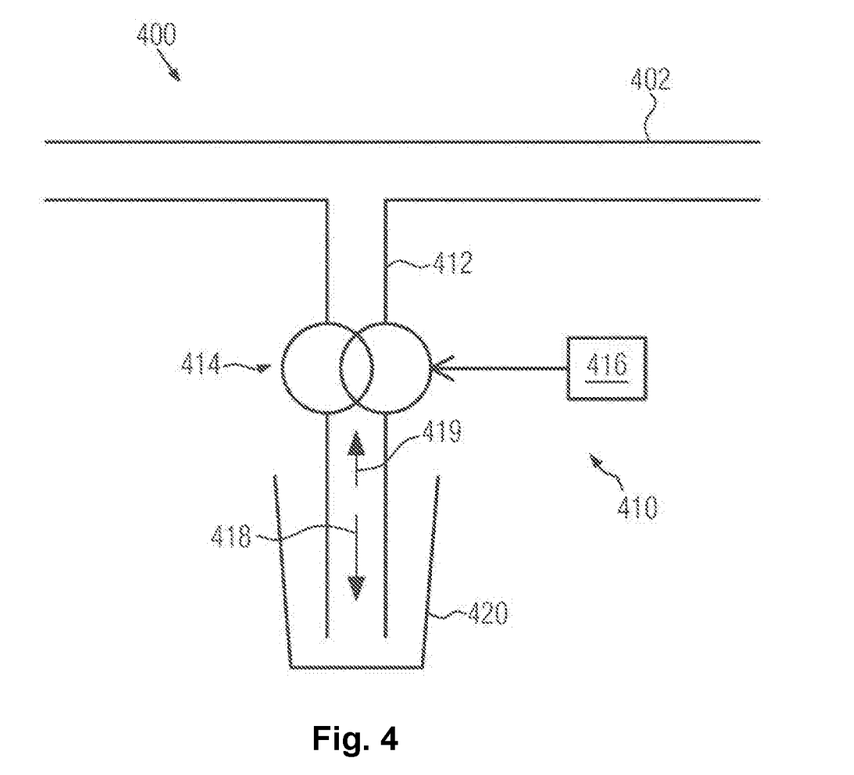
FIG. 4 schematically represents a sampling apparatus according to some illustrative embodiments of the invention.

With reference to FIG. 4 a milking device 400 with a sampling apparatus 410 is schematically shown. The milking device 410 includes a line 402, for example a short milk hose, a long milk hose, a milk line or a collection container. A connection line 412 is branched off at line 402, which connects the sampling apparatus 410 with line 402. The lower end of the line 413 between the pump 414 and the sampling apparatus 410 can reach at least partially into the sample container 420.

In illustrative embodiments, the sampling apparatus 410 comprises a pump 414 which is adapted to split off a sample subset from the line 402 along a first conveying direction 418 and to convey a quantity of split-off milk in a second conveying direction 419. The pump 414 can be operated according to illustrative embodiments in a first mode of operation in which the pump 414 takes a representative milk sample from line 402, in a second mode of operation according to the interruption mode of operation described above in which a partial quantity is taken from a sample container 420 connected to the sampling apparatus 410 along the second direction of flow 419 before sampling, and in a third mode of operation as described in more detail below.

In some illustrative embodiments, a control unit 416 can be provided which can represent an element of the sampling apparatus 410 or which is designed externally to the sampling apparatus 410 and can be coupled to it. The controller 416 can be designed to operate the pump 414 in the different mode of operations.

The first mode of operation can be carried out as described above in FIG. 1, whereby the sample subsets are separated.

The second mode of operation can be carried out according to the above described interruption mode of operation, as described with respect to FIG. 1 above, whereby the first mode of operation is interrupted and the second mode of operation is carried out. For example, an interruption of the first mode of operation and a further operation of the pump in the second mode of operation during the interruption of the first mode of operation can occur if the actual quantity conveyed so far approaches the predetermined quantity range and in particular deviates from it by a predetermined value at most. For example, the predetermined value may be within a range of about 1% to about 25% of an upper limit of the predetermined quantity range, or it may differ from an upper limit of the predetermined quantity range by a certain number of sample subsets, each of which is conveyed in a sample pulse interval during current operation, for example, one sample subset, two sample subsets, three sample subsets, to name a few non-restrictive examples.

In the second mode of operation, milk can be pumped back from sample container 420 into a waste container (not shown) corresponding to waste container 106 in FIG. 1 or pumped back into line 402. The latter case can occur if there is no preservative in the sample container 420.

In the third mode of operation, the connection line 412 is rinsed after the first mode of operation has been completed. The third mode of operation is performed to prevent the so-called carry-over problem. The third mode of operation takes place at the end of a milking process and in particular at the start of a subsequent milking process, whereby the pump 414 is operated at the start of the subsequent milking process along the second direction of flow 419 for a rinsing interval, for example for a period of one second to ten seconds, preferably from one second to seven seconds, more preferably at approximately three seconds to seven seconds, for example at approximately five seconds, so as to guarantee that any remaining milk from the cow milked in the previous milking process is removed from connection line 412. This removes from the sampling apparatus 410 and the connection line 412 and from the connection line 412 any residual milk from the milk that was milked in the previous milking process. Subsequent operation of the pump in the first mode of operation fills the connection line 412 and the sampling apparatus 410 with the milk of the cow milked in the subsequent milking process, thus preventing the carry-over problem.

In some illustrative embodiments of the present invention, a sampling apparatus is provided which can be operated independently of an electronic connection to a milk meter or other data network.

According to some illustrative embodiments of the present invention, sampling is made possible during a milking process in which a filling of a sample container useful for laboratory analysis can be split-off in a sample container despite a previously unknown milking time without excessive loss of milked milk.

In the following, an illustrative but not restrictive example of a method according to the invention is explicitly described with regard to a mobile sampling apparatus which, for example, can be designed according to the description of the sampling apparatus 100 in FIG. 1 and can be arranged in a milking device corresponding to one of the sampling apparatus 220a to 220f in FIG. 2. The sampling apparatus described below can function independently of a separate flow rate sensor as described above with regard to FIGS. 1 to 3 and, in particular, functions independently of an electronic connection to a milk meter (not shown in FIGS. 1 and 2) or to any other data network (not shown in FIGS. 1 and 2). This means that the sampling apparatus described below does not necessarily rely on empirical values for an individual animal to be milked, unless corresponding data from the sampling apparatus has been created in a history of past milking operations and stored in an external or internal memory device (not shown in FIGS. 1 and 2) connected to the sampling apparatus. In particular, for the sampling apparatus described here, instead of drawing on animal-specific empirical data, only a general estimate of the average quantity of milk to be expected in a herd (or possibly feeding group) can be provided.

A problem of missing animal-individual expected quantities, which occurs in particular with mobile devices, e.g. with a mobile sampling apparatus without intermediate storage of milk samples in an intermediate storage, can be counteracted according to some embodiments of the invention as described below.

In a first step, a sampling is initialized. A proportion of milk to be split-off is then estimated as a proportion of the total milk. Here, for example, a split-off rate can be estimated, which is calculated by a quotient from a desired filling of a sample container, e.g. 30 ml to 50 ml, and a predetermined expected value. The predetermined expected value can be entered by an operator, e.g. based on his experience with a herd or an animal to be milked, or it can be fixed in the sampling apparatus as an initial value. In an example, the predetermined expected value can be in the range of 6 kg to 30 kg. In illustrative examples, a split-off rate between 0.1% and approx. 0.9% or 1000 ppm to 9000 ppm can result.

In a further step, using a desired number of sample subsets, e.g. in a range of thirty to one hundred sample subsets, from which a representative milk sample is to be composed, a partial quantity is determined, which indicates after which quantity of milk conveyed in a conveying line, e.g. conveying line 10 in FIG. 1, of a milking device a split-of of a sample subset is to be carried out. In an illustrative example, the partial quantity can be determined as the quotient of the expected value to the desired number of sample subsets. In an illustrative example, a quantity of 60 g to 900 g can be obtained for each sample subset.

It is advantageous to start a sample collection with a uniform and on trend too high set split-off rate. This can be achieved, for example, by specifying an expected value that is expected to be too low or an underestimated expected value in the first step. In some illustrative examples, an estimate of an average milk quantity for a herd can be made and this can be offset with a weighting factor from a range between 0 and 1, e.g. 0.70. In an illustrative example shown here, an estimated expected value of e.g. 15 kg per milking can result in an underestimated expected value of 10.5 kg. This underestimated expected value can result in a sample container usually being completely filled before the end of milking. If this occurs, operation of a pump of the sampling apparatus is stopped by a control of the pump that knows exactly how much has been filled and the pump is next operated in the interruption mode described above. This prevents milk mixed with a preservative from overflowing and ending up in a milk line leading to a collection tank, for example.

If, for example, premature filling of a sample container is detected, e.g. a sample container has reached or exceeded a filling level of at least 40 ml, e.g. 48 ml, a number of sample subsets still in the pump and in connection lines to the sample container are pumped into the sample container and the pump is stopped. Then, as described above for the second mode of operation or interruption mode, a mixing process is carried out and applied to the milk in the sample container. For example, air can be introduced into the sample container below the surface of the milk as an air blast or mixing can be carried out with a built-in stirrer.

After mixing, the milk contents of the now homogeneous milk collected in the bottle are representative of the milk milked from the animal up to that point.

Then a part, e.g. 10 to 30 ml, preferably 20 ml+/−5 ml, of the mixed milk is pumped out of the sample container again by the pump switched in a reverse gear and disposed of into a waste container via a side channel. In particular, the representativeness of the homogeneous milk remaining in the bottle is not changed by the pumping process.

After this step, the sampling apparatus may, by controlling the pump or an additional CPU, calculate a new splitting rate reduced by the ratio of the remaining quantity in the sample container, e.g. 48 ml minus 20 ml, to a complete filling or a filling level reached before the reduction, e.g. 48 ml. This new splitting rate means the following: if this newly calculated splitting rate had been used from the start of milking, the exact amount of milk remaining in the sample container after pumping would have been collected by this time, for example 28 ml would have been filled into the bottle according to the explicit numerical values.

The controller can now use this recalculated splitting rate to continue pump operation in the mode of operation that was interrupted by the interruption mode of operation. The sample container can now be filled from the remaining part of the animal's milk until the end of milking.

Although a reduction of the sample quantity was carried out in the second mode of operation of the pump, the milk contents of this residual filling are again representative of the remaining part of the animal's milking. This ensures that the entire filling in the analysis bottle is representative of the entire milking of the animal.

If the sample container becomes full again before the end of milking, the second mode of operation can be repeated. The resulting next new splitting rate would then be the current splitting rate multiplied by a reduction factor as described above, for example, a reduction to 28 ml from an initial 48 ml filling would result in a reduction factor of 28/48.

It results that with this sampling apparatus a readjustment or optimization of the splitting rate is carried out.

In an illustrative embodiment of the sampling apparatus described above with regard to FIGS. 1 to 4, the pump described above with regard to different embodiments can be a positive displacement pump. This allows a pump to be provided whose flow rate is only slightly dependent on the discharged head of the pump. Furthermore, the flow rate of this pump can be adjusted very precisely and reproducibly via stroke height and number of strokes, which results in the conveying of very precisely and reproducibly adjusted discrete sample subsets. In particular, corresponding pumps are also suitable for low drive speeds, which can be advantageous, for example, when conveying milk samples in order to damage the sensitive fat globules in milk samples as little as possible.

Although the present invention has been described with regard to special embodiments relating to a milking process, this does not constitute a limitation of the invention. The invention is applicable to any system in which a foodstuff is conveyed in a conveying line at conveying intervals and representative samples of the foodstuff conveyed in the conveying line are to be split-off at the conveying interval. The invention provides an advantageous sampling apparatus which is capable of taking representative samples even if the conveying interval is not completely known at the time of the beginning of sampling.

The invention claimed is:

1. A sampling apparatus for taking a representative milk sample in a predetermined quantity range from a conveying line in which milk is conveyed at conveying intervals of unknown length, comprising:
   a pump,
   a controller of the pump, and
   a sample container connection element connected to the pump,
   wherein the controller is configured to control a pulsed operation of the pump in a first mode of operation in a conveying interval based on the predetermined quantity range and at least one of the following: a measured variable indicating a flow rate of the milk in g/min conveyed in the conveying line; and a predetermined variable indicating a total quantity of milk to be conveyed through the conveying line in a conveying interval,
   wherein the pump conveys a discrete sample subset of milk along a first conveying direction of the pump during pulsed operation in each sample pulse interval,
   wherein the predetermined quantity range is greater than or equal to a total quantity corresponding to a total number of discrete sample subsets of milk in the conveying interval, and wherein the controller is further configured to reduce a conveying speed of the pump and increase a frequency of sample pulse intervals as the flow rate of the milk in g/min conveyed in the conveying line decreases.

2. Sampling apparatus according to claim 1, wherein the controller is further configured to control the operation of the pump based on a comparison of an actual quantity corresponding to an actual number of sample subsets of milk conveyed and the predetermined quantity range.

3. Sampling apparatus according to claim 2, wherein the controller is configured to control the operation of the pump to interrupt the first mode of operation and convey a subset of the actual quantity of the actual number of sample subsets of milk conveyed at an interruption interval in a second mode of operation in a second conveying direction oriented opposite the first conveying direction.

4. Sampling apparatus according to claim 3, wherein the controller is further configured to control the pulsed operation of the pump to update, in the first mode of operation, a number of sample pulse intervals for the remaining duration of the conveying interval and/or a size of the sample pulse intervals after the interruption interval based on a remaining actual quantity.

5. Sampling apparatus according to claim 3, further comprising a mixing device adapted to mix the actual quantity collected in a sample container prior to the interruption interval, wherein the controller is further configured to activate the mixing device in the second mode of operation prior to operation of the pump in the interruption interval.

6. Sampling apparatus according to claim 1, wherein the controller is configured to update a number of sample pulse intervals based on a measured size of the sample pulse intervals after at least one sample pulse interval.

7. Sampling apparatus according to claim 1, further comprising a pair of ring electrodes adapted to detect a conductance of milk conveyed in the conveying line.

8. Sampling apparatus according to claim 7, further comprising a settling chamber and a pair of electrodes disposed in the settling chamber for detecting a conductivity of milk in the settling chamber.

9. Sampling apparatus according to claim 7, further comprising a further pair of ring electrodes adapted to detect a conductance of milk conveyed in the conveying line, wherein the controller is configured to control operation of the pump based on the flow rate of milk in g/min conveyed in the conveying line based on conductance values detected by the pair of ring electrodes and the further pair of ring electrodes.

10. Sampling apparatus according to claim 1, further comprising an optical flow sensor having a light source and a light detector connected to the controller, wherein the controller is further configured to control the pump based on data output from the optical flow sensor.

11. Method for taking representative milk samples in a predetermined quantity range from a conveying line in which milk is conveyed in conveying intervals of unknown length, wherein the predetermined quantity range is greater than or equal to a total quantity corresponding to a total number of discrete sample subsets of milk in the conveying interval,
and wherein the method comprises:
determining an operating rate of a pump, in a first mode of operation, based on the predetermined quantity range and a predetermined value that estimates at least one of a length of a conveying interval and a total quantity of the milk conveyed through the conveying line in the conveying interval and a quantity that indicates a flow rate in g/min of the milk conveyed in the conveying line in the conveying interval, the operating rate defining a certain number of sample pulse intervals, wherein the pump conveys a discrete sample subset of milk along a first conveying direction in each sample pulse interval, and
operating the pump based on the determined operating rate in the first conveying direction, wherein with decreasing flow rate of the milk in g/min conveyed in the conveying line, a conveying speed of the pump is reduced and a frequency of sample pulse intervals is increased.

12. Method according to claim 11, the method comprising during operation of the pump:
detecting at least one of an actual value indicating the flow rate in g/min in the conveying line,
updating the operating rate based on the detected actual value, and
operating the pump based on the updated operating rate in the first conveying direction.

13. Method according to claim 11, wherein operation of the pump in the first mode of operation is interrupted when an actual quantity of an actual number of sample subsets of milk conveyed approaches the predetermined quantity range up to a predetermined distance and it is determined on the basis of the detected actual value that a current conveying interval has not yet ended.

14. Method according to claim 13, further comprising operating the pump in a second mode of operation during an interruption interval in a second conveying direction opposite the first conveying direction to convey a subset of the actual quantity of the conveyed actual number of sample subsets of milk in the second conveying direction.

15. Method according to claim 14, wherein the second mode of operation further comprises mixing the actual quantity collected in a sample container prior to operating the pump in the interruption interval.

16. Method according to claim 4, further comprising updating the operating rate of the pump based on a remaining actual quantity after the interruption interval.

17. Method according to claim 14, further comprising operating the pump in a third mode of operation after the first mode of operation has been completed, wherein the pump is operated in the third mode of operation at a flushing interval for delivery along the second conveying direction of delivery.

18. Method according to claim 11, further comprising updating a number of sample pulse intervals based on a measured quantity of the milk after at least one sample pulse interval in the first mode of operation.

19. Method according to claim 11, wherein the determined operating rate in the first mode of operation specifies a sample subset of milk to be conveyed three times per minute.

* * * * *